3,060,092
17α-ALKYL-1-DEHYDRO-TESTOSTERONE
Arthur Nobile, Livingston, N.J., assignor to Schering Corporation, Bloomfield, N.J., a corporation of New Jersey
No Drawing. Filed Oct. 12, 1960, Ser. No. 62,095
8 Claims. (Cl. 167—74)

The present invention relates to novel 1,4-androstadiene compounds and to a process, specifically a microbiological treatment, for the manufacture of such androstadienes, and also of known androstadienes, in a simple and inexpensive manner, and in good yield.

This application is a continuation-in-part of my copending application Serial No. 449,257, filed August 11, 1954.

It is an object of the invention to provide new 1,4-androstadiene compounds having improved hormonal and particularly anabolic activity as compared with the corresponding 4-androstene compounds.

It is a more specific object of the invention to provide 1-dehydro derivatives of 17-methyl and 17-ethyl-testosterone characterized by improved activity over the known compounds and especially as anabolic agents.

A further object of the invention is to provide a process for the microbiological treatment of 17-methyl- and 17-ethyl-testosterone whereby introduction of a 1,2-double bond is effected without degradation of the steroid molecule, such as splitting of the D-ring, or degradation of the side chain.

A still further object of the invention is to accomplish one or more of the operations of oxidation, dehydrogenation, and hydrolysis, and including the introduction of a Δ¹-double bond, in 5-androstene-3-hydroxy, 5-androstene-3-acyloxy and 4-androstene-3-keto compounds by subjecting them to the action of a culture of *Corynebacterium simplex* (A.T.C.C. 6946) or of *Corynebacterium hoagii* (A.T.C.C. 7005) or of an enzymatic extract of such cultures.

A number of chemical transformations of steroids by microorganisms have recently been developed which have involved the introduction of one or more hydroxyl groups into the steroid nucleus, or oxidation of hydroxyl groups to keto groups but without affecting the degree of saturation of the steroid nucleus. More recently there has been published the chemical transformation of progesterone by the use of microorganisms, such conversions involving the introduction of a double bond in ring A, but with scission of carbon-carbon linkages in the side chain as well as in ring D (Fried, Thoma and Klingsberg, "Oxidation of Steroids by Microorganisms, III, Side Chain Degradation, Ring D Cleavage and Dehydrogenation in Ring A," J.A.C.S. 75, 5764 (1953)). As described in this publication, fermentation of progesterone with *Streptomyces lavendulae* afforded Δ¹,⁴-androstadien-3,17-dione, and also Δ¹,⁴-androstadien-17β-ol-3-one, known to be useful as intermediates in the synthesis of estradiol and estrone. This process thus involves the introduction of a Δ¹-double bond into progesterone, but with complete degradation of the side chain. With other microorganisms there was obtained not only elimination of the side chain, but also cleavage between carbon atoms 13 and 17. Thus, fermentation of progesterone with *Penicillium chrysogenum* gave the known testololactone, without introduction of a new double bond into ring A.

The above-named authors refer also to the fermentation of progesterone, Reichstein's compound S, and testosterone with *Cylindrocarpon radicicola*, and report that in each case they obtained Δ¹-dehydrotestololactone, i.e., the dehydrogenation was accompanied both by elimination of the side chain of the starting compound, when present, and by opening up of the D-ring.

It is accordingly a still further object of the present invention to provide a process for the introduction of a Δ¹-double bond into 17-methyl- and 17-ethyl-testosterone without simultaneous degradation of the side chain and without splitting of the D-ring, with or without hydrolysis (in the case of esters), and oxidation (as of hydroxyl groups), whereby compounds of improved physiological, and particularly anabolic activity are obtained.

Other objects and advantages of the invention will become apparent to those skilled in the art from the following more detailed description and the features of novelty will be set forth in the appended claims.

I have found that the operations of dehydrogenation, oxidation and ester-hydrolysis of 17α-methyl- and 17α-ethyl-derivatives of 3-keto-4-androstenes and of 3-hydroxy- and 3-acyloxy-5-androstenes can be accomplished in an efficient and inexpensive manner by incubating or fermenting the steroid with a culture medium containing *Corynebacterium simplex* or *Corynebacterium hoagii* (or the enzymatic extract thereof), the nature of the chemical transformation depending upon the character of the starting compound, and that one or more of the other reactions can be effected on the same starting material, in addition to the introduction of the double bond in the 1,2-position.

As indicated above, the starting compounds are 17-methyl- and 17-ethyl-androstenes. The presence of a free hydroxyl group appears to promote the chemical transformations, but such transformations occur even though the hydroxyl group is esterified and is ultimately itself oxidized to a keto group after being hydrolyzed in the process.

The starting compounds can have hydroxyl, keto, and ester groups in various positions of the nucleus or side chain; thus, hydroxyl groups may be present in the 3, and/or 17-positions; keto groups may occupy the 3 and/or 11 and/or 17-positions. Ester groups, including and preferably the esters of acids usually employed in steroid synthesis and in preparing steroid hormones for therapeutic use, and particularly of the lower alkanoic acids, may be located at the 3, 11, and 17-positions. The hydroxyl groups at the 3, 11, and 17-positions can be either the α- or β-epimers.

By the process of the present invention, I have been able to convert, for example, 17-ethyltestosterone directly into 17-ethyl-Δ¹,⁴-androstadiene-17β-ol-3-one, and 17-methyltestosterone directly into 17-methyl-Δ¹,⁴-androstadiene-17β-ol-3-one. These transformations may be represented schematically (in the case of 3-keto starting compounds) as follows:

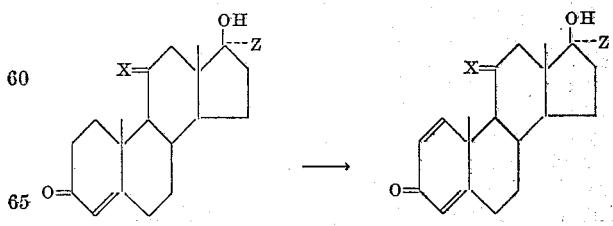

wherein Z is ... C₂H₅ or ... CH₃, and X==H₂, =O or 

The products from these reactions possess the same pharmacodynamic properties as do the corresponding alkylated testosterone, ethyl testosterone, and methyltestosterone, but to a considerably enhanced degree, which makes them valuable agents in the treatment of the many diseases and conditions for which the parent hormones are employed.

Typical specific reactions effected by the process of the invention are illustrated by the following:

(1)
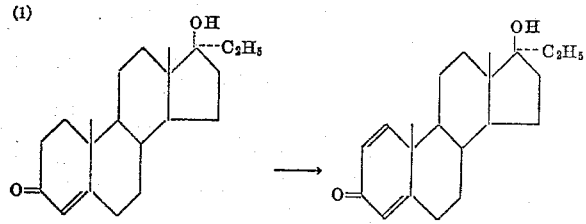

(2)
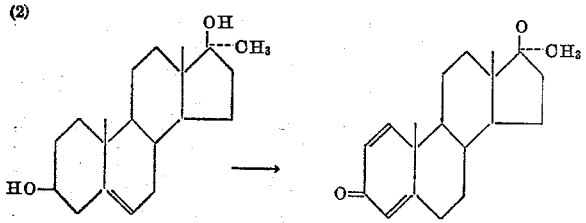

(3)
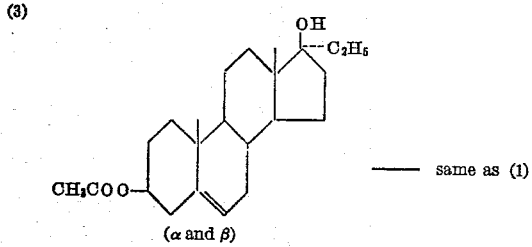

—— same as (1)

(α and β)

When the starting compound contains an ester group at the 17β-position, as of a lower alkanoic acid having up to 8 carbon atoms, such as acetic, propionic, butyric and valeric acids, or of an aromatic acid, like benzoic, such ester group is usually hydrolyzed to a greater or less degree; but the corresponding esters of the diene compound can be prepared in known manner by reaction with the acid or its anhydride or chloride in known manner.

As will be seen from the foregoing, the present invention makes it possible to prepare easily and directly the heretofore unknown 17-methyl and 17-ethyl-1-dehydrotestosterones and their 17-esters. The microbiological dehydrogenation is highly selective, so that good yields of the dienes are obtained. Also, when 17-methyl and 17-ethyl-5-androstene-3,17β-diols and their esters are available, it is unnecessary to hydrolyze the 3-ester group or to oxidize the 3-hydroxyl preliminary to the dehydrogenation, as these operations are effected in the microbial culture or by the separated enzymes thereof.

In order to obtain a desirable growth of Corynebacterium simplex (A.T.C.C. 6946) or of Corynebacterium hoagii (A.T.C.C. 7006), for the process of this invention, a suitable nutrient medium is prepared containing carbohydrate, organic nitrogen, cofactors, and inorganic salts. It is possible to omit the use of carbohydrate without completely impairing the growth of the organism. The steroid compound as a solid or in ethanol, acetone or any other water-miscible solvent which is non-toxic toward the organism, is added to the cultivated microorganism in a broth medium under sterile conditions. This culture is then shaken, aerated, or simultaneously aerated and agitated, in order to enhance the growth of the microorganism and the biochemical conversion of the steroid substrate. The steroid may be added to the broth medium and then inoculated with the bacterium, or the cultivated microorganism in broth medium may be added to the steroid. In certain cases, depending on the conditions of the reaction medium, it may be more desirable to obtain optimum growth of the microorganism before the addition of the steroid. Alternatively, enzyme preparations obtained in known manner from cultures of the microorganism may be used for carrying out the process.

A useful method for carrying out the process is the cultivation of Corynebacterium simplex or hoagii on a suitable nutrient medium under aerobic conditions. After cultivation of the microorganism, the cell mass may be harvested by centrifuging the nutrient broth, decanting the supernatant liquid and suspending the cell mass in saline. A suitable volume of the cell suspension is then seeded into a desirable nutrient medium for supporting growth of the microorganism. The nutrient medium employed may be a yeast extract (Difco), casein hydrolysate (H-Z-Amine) (Type B Sheffield), corn steep liquor, water extract of soybean oil meal, lactalbumin hydrolysate (Edamine-Sheffield enzymatic), fish solubles, and the like.

Inorganic salts are desirable to maintain a pH level in the reaction medium of between 6.8 and 7.2. The use of inorganic salts for buffering the reaction mixture may be omitted. The omission of inorganic salts causes the pH to rise from an inital value of 6.8 to about 7.7–8. This, however, will still permit the formation of the desired steroidal end products. The optimum temperature for growth of the selected microorganism is 37° C. but the temperatures may vary between 25° and 37° and even between 20° and 40° C. The time of reaction may vary from as little as 12 hours to as much as 48 hours. The length of time which is employed will depend on the steroid which is being transformed. Any water miscible non-toxic (to the organism) solvent may be employed to dissolve or suspend the steroid. I prefer to use ethanol or acetone in such amounts that the final concentration of these solvents in the reaction mixture is no higher than about 7% and may amount to only traces; owing to evaporation, the final concentration of the organic solvent may even be practically zero.

Following the completion of the oxidation or dehydrogenation process, the products of reaction may be recovered from the mixture by extraction with a suitable water-immiscible solvent, by filtration, by absorption on a suitable adsorbent, or by any one of the other procedures commonly used in the art. For extraction, chlorinated lower hydrocarbons, ketones, and alcohols are useful. These include chloroform, methylene chloride, trichloroethane, ethylene dichloride, butanol, diethylketone, and others. I prefer to use extraction as the method for isolating the steroidal products. Following extraction, the products may be isolated by concentration of the extracts to a small volume or to dryness. Purification of the residues may be then accomplished in several ways. In many instances, simple recrystallizations from a suitable solvent or solvent mixture, such as acetone, methylene chloride, ethanol, acetone-hexane, methylene chloride-hexane, etc., affords the desired dienone in excellent yield and high state of purity. Where there are several products formed in the same reaction, separation is conveniently achieved by chromatography on silica gel, magnesium silicate (Florisil), alumina or other commonly employed adsorbents.

The chemical transformations which can be accomplished by subjecting the various 17α-methyl- and 17α-ethyl-17β-hydroxy androstenes to the action of a culture of Corynebacterium simplex or hoagii (the term "culture" of Corynebacterium simplex or of Corynebacterium hoagii is to be understood in this specification and in the claims as including the enzymatic extract of such cultures) are thus of widely different kinds, and can take place singly, or two or more of such transformations can occur simultaneously or in sequence. The various reactions appear to be unaffected by other substituents in the steroid nucleus, such as an 11-keto or an 11β-hydroxyl group.

The fish solubles referred to hereinabove are presently available commercially as an extract of herring, menhaden, and various mixtures thereof, which has been subjected to an enzymatic hydrolysis. This material can be added directly to the culture broth for supplying the nutrient material. Where fish solubles (50% solid content) are available which have not been subjected to enzymatic hydrolysis, such extracts should be diluted with water and steamed for about 10 minutes at 90° C., followed by filtration, preferably with the aid of Filter-Cel.

The invention will be described in further detail in the following examples which are presented by way of illustration only and not as indicating the scope of the invention.

EXAMPLE 1

*Conversion of 17α-Methyltestosterone Into 17α-Methyl-$\Delta^{1,4}$-Androstadiene-17β-Ol-3-One*

A one hundred ml. broth culture containing a 0.1% yeast extract concentration, 9.0 ml. of 0.2 M $KH_2PO_4$ and 9.0 ml. of 0.2 M $Na_2HPO_4$ is seeded with 1 ml. of a 24-hour broth culture of *Corynebacterium simplex* (A.T.C.C. 6946). The flask is incubated at 28° C. for 24 hours. 150 mg. of 17-methyltestosterone in 5 ml. of acetone are added and the culture and steroid substrate are incubated for 48 hours at 28°–30° C.

The product is extracted with 3 equal volumes of chloroform, the extracts combined and the product isolated by evaporation to dryness. Recrystallization of the residue from acetone-hexane gives crystalline 17α-methyl-$\Delta^{1,4}$-androstadiene-17β-ol-3-one.

In place of acetone there can be employed other water-miscible organic solvents which are non-toxic to the organism such as ethanol, mixtures of ethanol and acetone, and the like.

EXAMPLE 2

*17α-Ethyl-$\Delta^{1,4}$-Androstadiene-17β-Ol-3-One*

17α-ethyltestosterone (150 mg.) prepared according to Ruzicka, Hofmann and Meldahl, Helv., 21, 597 (1938), is subjected to fermentation by the procedure of Example 1. Extraction of the fermentation broth with chloroform and repeated crystallization of the extract from acetone-hexane affords 17α-ethyl-$\Delta^{1,4}$-androstadiene-17β-ol-3-one a crystalline solid.

EXAMPLE 3

*17α-Methyl-$\Delta^{1,4}$-Androstadiene-11β,17β-Diol-3-One*

17α-methyl-$\Delta^{1,4}$-androstene-11β,17β-diol-3-one (150 mg.) prepared according to Herr et al., J.A.C.S., 78, 500 (1956), is treated as described in Example 1. Extraction of the fermentation broth with chloroform and repeated crystallization of the extract from acetone-hexane yields crystalline 17α-methyl-$\Delta^{1,4}$-androstadiene-11β,17β-diol-3-one.

EXAMPLE 4

*17α-Ethyl-$\Delta^{1,4}$-Androstadiene-11β,17β-Diol-3-One*

The starting material of Example 2 is 11β-hydroxylated microbiologically with *Curvularia lunata*, according to the procedure of U.S. Patent No. 2,658,023. The resulting 17α-ethyl-$\Delta^4$-androstene-11β,17β-diol-3-one is isolated by extraction with chloroform and crystallized from acetone-hexane. It is then treated by the procedure of Example 1. The resulting fermentation broth is extracted with chloroform, and the extract is crystallized from acetone-hexane to yield crystalline 17α-ethyl-$\Delta^{1,4}$-androstadiene-11β,17β-diol-3-one.

EXAMPLE 5

*17α-Methyl-$\Delta^{1,4}$-Androstadiene-17β-Ol-3,11-Dione*

The product of Example 3 (100 mg.) is oxidized by dissolving it in 5 ml. of 95% aqueous acetic acid containing 50 mg. of chromic acid ($CrO_3$) at 15–20° C. After one hour at this temperature, excess sodium bisulfite is added with agitation and the reaction mixture is diluted with 45 ml. of water. The product is then isolated by chloroform extraction and the extract is crystallized from acetone-hexane, affording crystalline 17α-methyl-$\Delta^{1,4}$-androstadiene-17β-ol-3,11-dione.

EXAMPLE 6

*17α-Ethyl-$\Delta^{1,4}$-Androstadiene-17β-Ol-3,11-Dione*

The product of Example 4 is oxidized and the oxidation product further treated by the procedure of Example 5, yielding crystalline 17α-ethyl-$\Delta^{1,4}$-androstadiene-17β-ol-3,11-dione.

In the above examples the preferred type of starting materials are employed, namely, the 17-alkylated-3-keto-4-pregnene compounds, with or without a substituent at the 11-position. However, the corresponding 3(α or β)-hydroxy-5-pregnene compounds, or their 3-esters, can likewise be employed to give the same 17α-methyl and 17α-ethyl-1,4-androstadienes with substantially the same yields.

When 3-esters are used as starting compounds, the lower alkanoic esters are generally preferred, but it will be understood that the specific character of the ester is not controlling in my process and that other esters, both of organic and inorganic acids, may be employed, such as the benzoates, cyclopentyl and cyclohexyl acetates, propionates and butyrates, and also the phosphates, polyphosphates and sulfates, it being necessary only that the esters be non-toxic toward the microorganism. The products can be converted into the 17β-esters of these and other acids in known manner, as described below.

EXAMPLE 7

*17α-Methyl-$\Delta^{1,4}$-Androstadiene-17β-Ol-3-One 17-Acetate*

A mixture of 1.0 g. of 17α-methyl-$\Delta^{1,4}$-androstadiene-17β-ol-3-one (Example 1) and 5 ml. of acetic anhydride is heated at reflux for one-half hour. To the cooled reaction mixture are then added 50 ml. of water. The resulting precipitate is separated by filtration, washed with water, dried and recrystallized from methanol-water. The resulting crystalline solid is 17α-methyl-$\Delta^{1,4}$-androstadiene-17β-ol-3-one 17-acetate. By the same procedure, the 17-acetate of the products of Examples 2, 3, 4, 5 and 6 are also prepared as crystalline solids.

EXAMPLE 8

*17α-Methyl-$\Delta^{1,4}$-Androstadiene-17β-Ol-3-One 17-Propionate*

In the procedure of Example 7, 5 ml. of propionic anhydride are employed in place of acetic anhydride. The reaction mixture is held at 150° for one hour and is then worked up according to the method of Example 7. Thereby is obtained crystalline 17α-methyl-$\Delta^{1,4}$-androstadiene-17β-ol-3-one 17-propionate.

By the same procedure, the 17-propionates of the product of Examples 2, 3, 4, 5 and 6 are also prepared as crystalline solids. The other esters of the steroid alcohols are prepared by analogous procedures, or by other esterification processes known in the art.

The novel compounds of the invention are preferably administered by mouth in the form of tablets containing, for example, from 5 to about 50 mg. of the steroid per tablet, mixed with a solid, non-toxic pharmaceutical carrier containing one or more of the usual carrier ingredients, such as starches, sugars, gums, gelatin, soaps, clays, and the like. They may, however, also be administered by subcutaneous or intramuscular injection, dissolved or suspended in a suitable non-toxic pharmaceutically acceptable liquid vehicle; or they can be administered in the solid form by subcutaneous implantation, or in the form of suppositories dissolved or suspended in a fatty or waxy vehicle which melts at approximately body temperature. They can also be administered topically in the form of an ointment or cream in which they are dissolved or suspended in an unguent or cream base of any known type; they may also be employed in the form of ointments and aqueous suspensions, and in the microcrystalline form in aqueous suspensions they can be used for intra-articular injection.

The following are examples of the preparation of tablets containing the compounds of my invention, but it will be understood that the commercial preparations of my invention are not limited to these compositions, it being apparent to persons skilled in the art how my new compounds can be incorporated in various kinds of pharmaceutical preparations:

*Example A*

|  | Mg./tablet |
|---|---|
| 17α-methyl-1,4-androstadiene-17β-ol-3-one | 5.00 |
| Starch, food grade | 45.16 |
| Amijel, BO–11, Corn Products Refining Co. | 10.39 |
| Lactose, U.S.P. | 108.64 |
| F.D. and C. Blue No. 1, certified | 0.0075 |
| F.D. and C. Yellow No. 5, certified | 0.0025 |
| Magnesium stearate, U.S.P. | 0.80 |
| Total tablet weight | 170.00 |

*Example B*

|  | Mg./tablet |
|---|---|
| 17α-ethyl-androstadiene-17β-ol-3-one | 25.00 |
| Lactose, U.S.P. | 155.275 |
| Starch, food grade | 40.00 |
| F.D. and C. Red No. 3, certified | 0.225 |
| Gelatin, U.S.P. | 3.0 |
| Sterotex (refined hydrogenated vegetable oil) | 1.50 |
| Total tablet weight | 225.00 |

The above mixtures are pressed in the usual manner into tablets. These tablets, and other pharmaceutical preparations containing the novel steroids, are useful generally for their greater anabolic activity than the corresponding 4-pregnene compounds. Thus, although methyl-testosterone has been widely used as an anabolic agent, its 1-dehydro derivative is characterized by a considerably greater anabolic activity.

I claim:
1. A compound of the formula

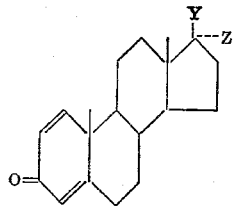

wherein Y is a member of the group consisting of hydroxyl and O-acyl, the acyl group being that of a pharmaceutically acceptable acid, while Z is a member of the group consisting of methyl and ethyl.

2. A tablet containing an active component consisting essentially of a compound as defined in claim 1, together with a pharmaceutically acceptable carrier.

3. 17α-methyl-1,4-androstadiene-17β-ol-3-one.

4. 17α-ethyl-1,4-androstadiene-17β-ol-3-one.

5. The lower alkanoic acid esters of 17α-methyl-1,4-androstadiene-17β-ol-3-one.

6. The lower alkanoic acid esters of 17α-ethyl-1,4-androstadiene-17β-ol-3-one.

7. 17α-methyl-1,4-androstadiene-17β-ol-3-one 17-acetate.

8. 17α-ethyl-1,4-androstadiene-17β-ol-3-one 17-acetate.

References Cited in the file of this patent

UNITED STATES PATENTS

| 2,280,828 | Inhoffen | Apr. 28, 1942 |
| 2,340,388 | Inhoffen et al. | Feb. 1, 1944 |
| 2,579,479 | Djerassi et al. | Dec. 25, 1951 |
| 2,602,769 | Murray et al. | July 8, 1952 |
| 2,837,464 | Nobile | June 3, 1958 |
| 2,864,832 | Eppstein et al. | Dec. 16, 1958 |

OTHER REFERENCES

Seyle: Textbook of Endocrinology, University of Montreal, Montreal, Canada (1947), p. 914.

Fieser et al.: Natural Products Related to Phenanthrene, third edition, 1949, Reinhold Pub. Corp., New York, N.Y., p. 704.

Fried et al.: 75 J.A.C.S. 5764 (1953).